(12) United States Patent
Kubota

(10) Patent No.: US 12,067,961 B2
(45) Date of Patent: Aug. 20, 2024

(54) MUSICAL INSTRUMENT SYSTEM

(71) Applicant: KOTO CO., LTD., Kyoto (JP)

(72) Inventor: Kazuhiro Kubota, Kyoto (JP)

(73) Assignee: KOTO CO., LTD., Nakagyo-ku (JP)

( * ) Notice: Subject to any disclaimer, the term of this patent is extended or adjusted under 35 U.S.C. 154(b) by 609 days.

(21) Appl. No.: 17/341,661

(22) Filed: Jun. 8, 2021

(65) Prior Publication Data

US 2022/0392425 A1 Dec. 8, 2022

(51) Int. Cl.
*G10H 1/00* (2006.01)
*G10H 7/00* (2006.01)

(52) U.S. Cl.
CPC ........... *G10H 1/0041* (2013.01); *G10H 7/002* (2013.01); *G10H 2230/065* (2013.01)

(58) Field of Classification Search
CPC . G10H 1/0041; G10H 7/002; G10H 2230/065
USPC ......................................................... 84/601
See application file for complete search history.

(56) References Cited

U.S. PATENT DOCUMENTS

| | | | | |
|---|---|---|---|---|
| 4,425,098 A * | 1/1984 | Doring | ................... | G11B 33/06 281/38 |
| 4,519,044 A * | 5/1985 | Munetsugu | .......... | G10H 1/0008 708/134 |
| 4,681,008 A * | 7/1987 | Morikawa | ............ | G10H 1/0033 984/391 |
| 5,300,723 A * | 4/1994 | Ito | ........................ | G10H 1/0008 84/615 |
| 5,496,179 A * | 3/1996 | Hoffman | ................ | G09B 15/04 84/479 A |
| 5,847,302 A * | 12/1998 | Morikawa | ................ | G10H 7/02 84/603 |
| 6,194,648 B1 * | 2/2001 | Takahashi | .............. | G10H 1/186 84/602 |
| 6,727,417 B2 * | 4/2004 | Oren-Chazon | ........ | G09B 15/04 84/478 |
| 6,750,978 B1 * | 6/2004 | Marggraff | ............. | G06F 16/955 707/E17.112 |
| 8,261,967 B1 * | 9/2012 | Long | ........................ | G09B 3/06 235/375 |
| 2002/0121180 A1 * | 9/2002 | Kondo | ................... | G09B 15/04 84/477 R |

(Continued)

FOREIGN PATENT DOCUMENTS

| | | | | |
|---|---|---|---|---|
| CH | 658141 A5 | * | 10/1986 | |
| CN | 106952510 A | * | 7/2017 | ............. G09B 15/00 |

(Continued)

*Primary Examiner* — Christina M Schreiber
(74) *Attorney, Agent, or Firm* — Idea Intellectual Limited; Margaret A. Burke; Sam T. Yip

(57) ABSTRACT

A musical instrument system includes a sound element medium including a plurality of sound-element information areas each having sound element information on a sound element, a reader configured to read the sound element information, a generator configured to generate musical sound information based on the read sound element information, and an audio unit configured to produce a sound based on the generated musical sound information, each of the sound-element information areas having a display corresponding to the sound element information, and the sound element information relating to both or one of pitch and tone.

10 Claims, 15 Drawing Sheets

(56) References Cited

U.S. PATENT DOCUMENTS

| | | | |
|---|---|---|---|
| 2003/0159564 A1* | 8/2003 | Oren-Chazon | G09B 15/04 84/477 R |
| 2006/0097449 A1* | 5/2006 | Gagnon | A63F 3/00119 273/242 |
| 2007/0240559 A1* | 10/2007 | Hasebe | G10H 1/386 84/637 |
| 2009/0114079 A1* | 5/2009 | Egan | G09B 15/023 84/477 R |
| 2009/0241041 A1* | 9/2009 | Cozine | G06F 3/0483 715/762 |
| 2010/0294112 A1* | 11/2010 | Asakura | G10H 1/368 84/613 |
| 2012/0055319 A1* | 3/2012 | Lin | G10H 1/0016 84/744 |
| 2013/0000462 A1* | 1/2013 | Freiberg | G09B 15/023 84/477 R |
| 2013/0157761 A1* | 6/2013 | Cichowlas | A63F 13/46 463/31 |
| 2015/0068387 A1* | 3/2015 | Shi | G09B 15/023 84/471 R |
| 2021/0248983 A1* | 8/2021 | Balassanian | G06N 3/08 |
| 2022/0392425 A1* | 12/2022 | Kazuhiro | G09B 15/00 |

FOREIGN PATENT DOCUMENTS

| | | | | |
|---|---|---|---|---|
| CN | 106952510 B | * | 2/2020 | G09B 15/00 |
| CN | 218100486 U | * | 12/2022 | |
| GB | 2254954 A | * | 10/1992 | G09B 15/003 |
| JP | H1097251 A | * | 4/1998 | |
| JP | 2000231384 A | * | 8/2000 | |
| JP | 2001265332 A | * | 9/2001 | G10H 1/0025 |
| JP | 2002073014 A | * | 3/2002 | |
| JP | 2012103575 A | * | 5/2012 | |
| JP | 2017211565 A | * | 11/2017 | |
| KR | 100375936 B1 | * | 3/2003 | |
| KR | 20160104644 A | * | 9/2016 | |
| WO | WO-2015113360 A1 | * | 8/2015 | A63F 13/21 |
| WO | WO-2017069117 A1 | * | 4/2017 | |

\* cited by examiner

MUSICAL INSTRUMENT SYSTEM

BACKGROUND

Field of the Invention

The present invention relates to a musical instrument system that reads a sound element to produce a sound, a sound element medium having a sound element, and a reader converter that reads a sound element of the sound element medium.

Background Information

WO 2017-69117 discloses a music learning method that efficiently develops a score-reading ability, a sense of pitch, and a sense of rhythm of a user using a musical score for performance. This musical score symbolizes pitches and makes a graph of the sounding timing of note values in a conventional musical score.

JP 2017-211565 A discloses a music teaching material including a single card having an electronic circuit with a computer chip, and a push button and a loudspeaker for playing a sound that are built in the card, and the surface of the card is marked with the note symbol of the sound to be played.

SUMMARY

The music learning method as stated above develops a user's sense of sound through a practicing of playing a musical instrument while reading a musical score.

This learning method assumes that the user is able to play a musical instrument. Beginners have to start practicing of playing with the instrument, and it is not suitable for learners who are not good at playing musical instruments.

The aforementioned music teaching material uses the cards each incorporating a circuit with a computer chip. This means that the manufacturing cost will increase with the number of the cards, and this music learning material is expensive as a material for general home use targeted at children (learners) including infants.

Embodiments of the present invention aim to provide a musical instrument system, a sound element medium, and a reader converter which are easy to operate and can reduce the manufacturing cost of music learning materials.

To achieve the above aim, embodiments of a musical instrument system according to the present invention includes: a sound element medium including a plurality of sound-element information areas each having sound element information on a sound element; a reader configured to read the sound element information; a generator configured to generate musical sound information based on the read sound element information; and an audio unit configured to produce a sound based on the generated musical sound information. Each of the sound-element information areas has a display corresponding to the sound element information, and the sound element information relates to both or one of pitch and tone.

In the musical instrument system according to embodiments of the present invention, the plurality of sound-element information areas include at least one pitch information area having information on the pitch, and a tone information area having information on the tone. The reader reads information on the tone of the tone information area and information on the pitch of the at least one pitch information area, and the generator generates musical sound information to produce a sound with the pitch and the tone.

In the musical instrument system according to embodiments of the present invention, the at least one pitch information areas includes a plurality of pitch information areas, the plurality of pitch information areas is disposed in rows, and the reader reads the plurality of pitch information areas in an order of the rows.

In the musical instrument system according to embodiments of the present invention, the plurality sound-element information areas includes a surface of a flat card.

In the musical instrument system according to embodiments of the present invention, the plurality of sound-element information areas is located on a single plane.

In the musical instrument system according to embodiments of the present invention, the sound element information relating to the sound element is printed on the display in a superimposed manner to be optically readable by the reader.

In the musical instrument system according to embodiments of the present invention, the generator generates the musical sound information when the read sound element information is different from the sound element information read immediately before.

The musical instrument system according to embodiments of the present invention further includes a storage unit that stores the read information on tone. The generator generates musical sound information based on the stored information on tone.

To achieve the above aim, a sound element medium according to embodiments of the present invention includes a plurality of sound-element information areas each having sound element information on a sound element. Each of the sound-element information areas has a display corresponding to the sound element information, and the sound element information relates to both or one of pitch and tone.

In order to achieve the above aim, a reader converter according to embodiments of the present invention includes: a reader configured to read sound element information from a sound element medium, the sound element medium including a plurality of sound element information areas each having sound element information on a sound element, each of the sound-element information areas having a display corresponding to the sound element information, the sound element information relating to both or one of pitch and tone; and a generator configured to generate musical sound information based on the read sound element information.

Embodiments of the present invention provide a musical instrument system that can be easily operated and functions as a music learning material that can be produced at a low cost.

BRIEF DESCRIPTION OF THE DRAWINGS

The invention will be explained in more detail hereinafter with reference to the drawings.

FIG. 8A is a plan view, and FIG. 8B is a side view.

DETAILED DESCRIPTION OF THE EMBODIMENTS

Figure 1:
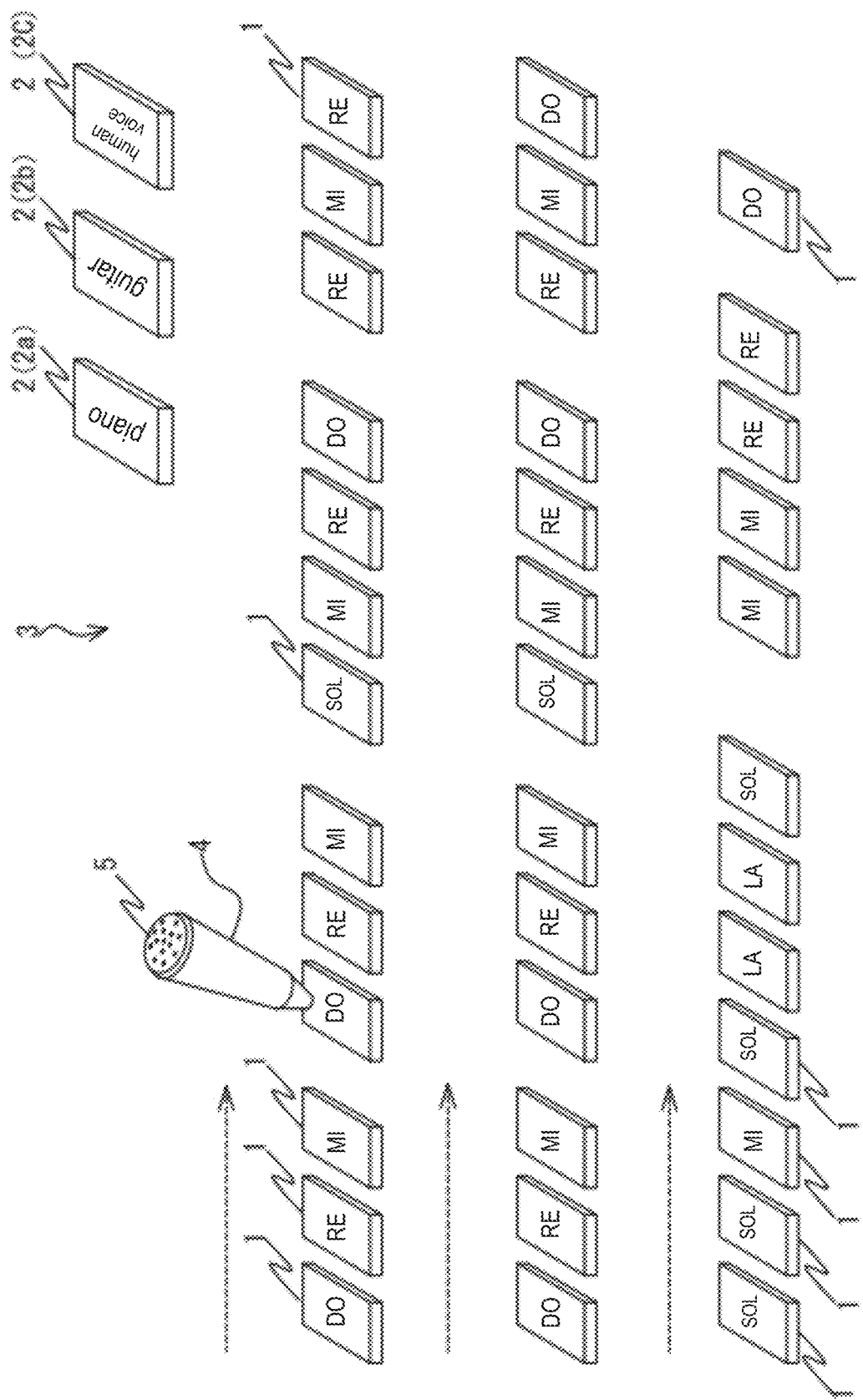
FIG. 1 is a perspective view illustrating a musical instrument system according to a first embodiment (Embodiment 1) of the present invention.

Referring to the drawings, the following describes some embodiments of the present invention.

Embodiment 1

As illustrated in FIG. 1, a musical instrument system according to an embodiment of the present embodiment includes: a sound element medium 3 having a plurality of pitch cards 1 and a plurality of tone cards 2; and a reader converter 4. This musical instrument system 100 produces a sound based on a sound element read by the reader converter 4 from the sound element medium 3 to play a song. A specific description will be given below.

Each pitch card 1 is a flat card that has information about the pitch of the sound element. In the embodiment of the present invention, the information about pitch shows how high or low the sound is, and typically pitch identification information is used for this, which is uniquely defined to distinguish the solfas including "do", "re", and "mi", and distinguish the pitch names including "C", "D", and "E". On the surface of each pitch card 1, a display of the pitch (e.g., letters such as "do", "re", and "mi") is visibly printed. In this way, the surface of the pitch card 1 functions as a pitch-attached surface with a display related to the pitch. On the pitch-attached surface, a dot pattern is printed in a superimposed manner on the display. The dot pattern is a coded version of the pitch identification information. Hereinafter, the dot pattern of the pitch card 1 is referred to as a pitch dot pattern. A plurality of these pitch cards 1 required for the score of a piece of music is placed in rows in the order of the pitches in the piece of music (indicated by arrows in the drawing). The reader converter 4 reads the pitch dot patterns of these plurality of pitch cards 1, which makes the environment of playing the music by producing the sounds with the pitches in the order of rows. Each of these pitch cards 1 inputs the pitch identification information to the reader converter 4, and functions as a pitch information area in the sound element medium 3.

Each tone card 2 (2a. 2b, 2c) is a flat card that has information about the tone of the sound element.

In the embodiment of the present invention, the information about the tone is tone identification information that defines uniquely a tonal quality to distinguish the tonal qualities, such as "piano", "guitar" and "human voice", that are typical examples. On the surface of each tone card 2, a display of the tone (e.g., letters such as "piano", "guitar", and "human voice") is visibly printed. In this way, the surface of the tone card 2 functions as a tone-attached surface with a display related to the tone. On the tone-attached surface, a dot pattern is printed in a superimposed manner on the display. The dot pattern is a coded version of the tone identification information. Hereinafter, the dot pattern of the tone card 2 is referred to as a tone dot pattern. Each of these tone cards 2 inputs the tone identification information to the reader converter 4, and the plurality of tone cards 2 is placed separately from the plurality of pitch cards 1. The tone cards 2 then function as a tone information area in the sound element medium 3. These tone cards 2 each may include pitch identification information indicating "do", for example, so that when the tone dot pattern is read, the corresponding sound is produced in the tone specified by the tone dot pattern.

These pitch dot patterns and tone dot patterns are encoded information about the pitch and tone that are sound elements. These patterns may also include, as information about the sound elements, tone change information that indicates whether or not to change the tone. Specifically, the pitch dot pattern 1 of each pitch card 1 may include information indicating that the tone is not changed. The tone dot pattern may include information indicating that the tone is changed, and functions as a sound-element change information area in the sound element medium 3.

In response to user's operation with the reader converter 4 on the sound element medium 3, sound elements (pitches and tones) that the sound element medium 3 has are read. Hereinafter, the pitch-attached surface of the pitch card 1 and the tone-attached surface of the tone card 2 making up the sound element medium 3 are collectively referred to as a sound-element attached surface. These pitch cards 1 and tone cards 2 are for inputting sound element information to the reader converter 4, and function as a sound-element information area in the sound element medium 3.

The reader converter 4 is a pen-type device that optically reads the dot patterns attached to these cards 1 and 2 (sound element medium 3) and generates musical sound information based on the information shown with the dot patterns. The reader converter 4 is integral with a speaker 5.

Figure 2:
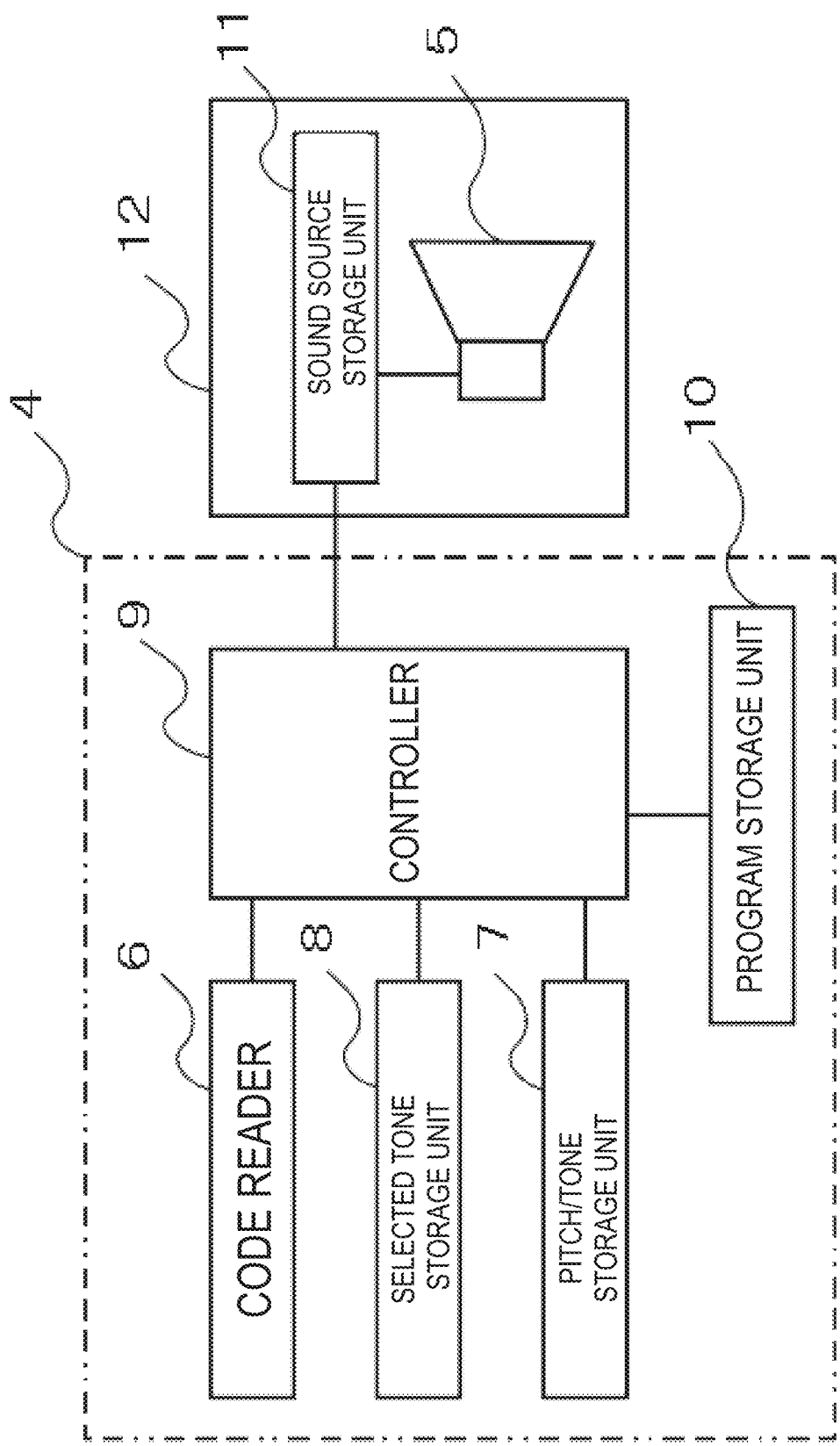
FIG. 2 is a block diagram illustrating a reader converter illustrated in FIG. 1.
Figure 3:
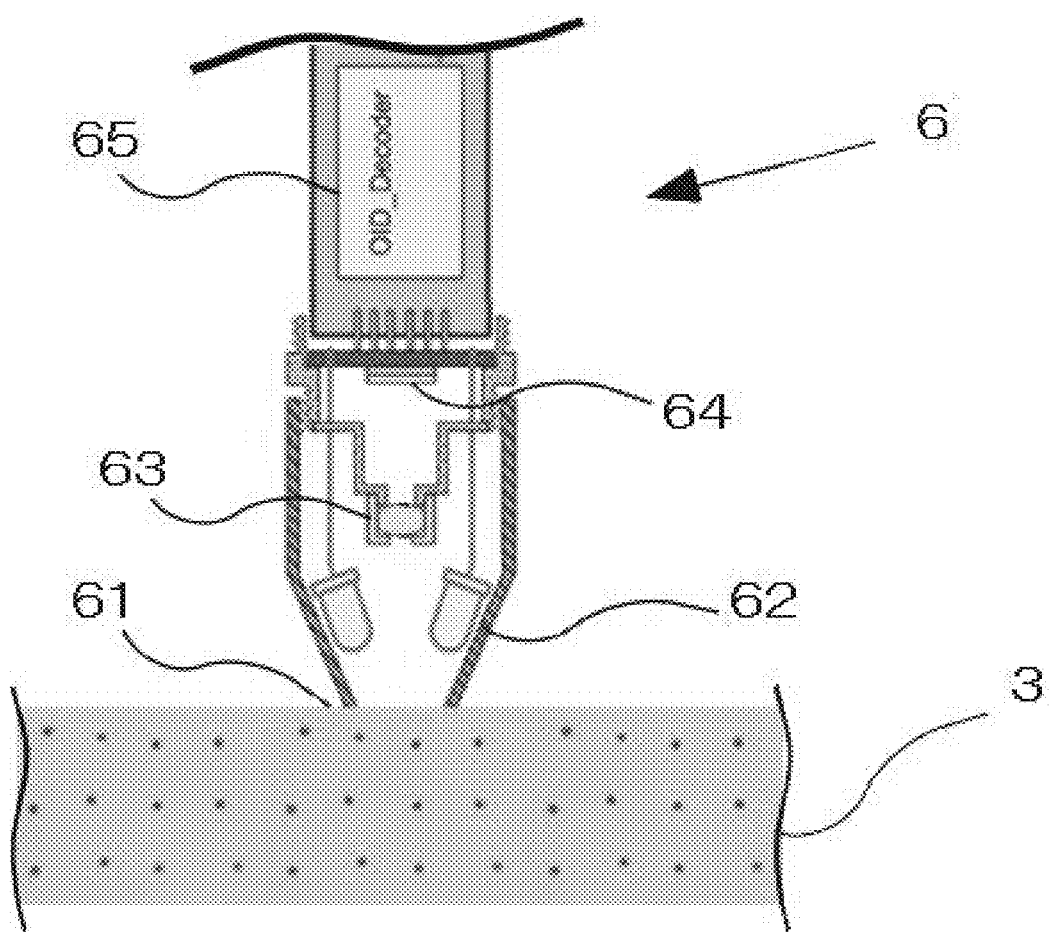
FIG. 3 is a perspective side view illustrating a reader in FIG. 2.

As illustrated in FIG. 2, the reader converter 4 includes a reader 6. The reader 6 reads the dot patterns of the sound element medium 3. As illustrated in FIG. 3, the reader 6 includes LEDs 62 that emit light from an opening 61 at the tip of the reader converter 4, an image sensor 64 that receives the light reflected from the sound-element attached surface through a lens 63, and a decoder IC 65 that decodes the dot pattern printed on the sound-element attached surface based on the output from the image sensor 64. The sound-element information output from the decoder IC 65 (base information on sound element) is input to a controller 9 of the reader converter 4.

The reader converter 4 includes a storage unit (memory). This storage unit includes a pitch/tone storage unit 7, a selected tone storage unit, and a program storage unit. The pitch/tone storage unit 7 stores information on pitch (pitch information) and information on tone (tone information). In the present embodiment, the pitch information includes solfas such as "do", "re", and "mi", and pitch names such as "C", "D", and "E". The pitch information is stored in association with the pitch identification information as stated above. The tone information indicates the tones such as "piano", "guitar", and "human voice", and is stored in association with the tone identification information as stated above. The selected tone storage unit temporarily stores the tone information selected from the above-mentioned pitch/tone storage unit 7. The program storage unit stores a musical sound creation program (see FIG. 4) that makes the CPU function as the controller 9.

The reader converter 4 also includes a CPU that functions as the controller 9. The controller 9 controls to acquire sound element information from the reader 6, extract pitch identification information and tone identification information from the acquired sound element information, generate musical sound information based on the extracted pitch identification information and tone identification information, and output the musical sound information to an audio unit 12. If the sound element information newly acquired from the reader 6 is different from the sound element information acquired immediately before, the controller 9 may extract pitch information and tone information corresponding to the newly acquired sound element information from the pitch/tone storage unit 7, and store the extracted tone information in the selected tone storage unit 8. At this time, if there is no tone information corresponding to the newly acquired sound element information, or if the tone change information in the sound element information contains the information indicating that the tone is not to be changed, the controller 9 extracts the tone information already stored in the selected tone storage unit 8.

The audio unit 12 produces a musical sound based on the musical sound information acquired from the controller 9, and includes a sound source storage unit 11 that stores sound source information (way, MIDI, etc.) and the speaker 5 that outputs a musical sound extracted from the sound source storage unit 11. The audio unit 12 is connected to the reader converter 4 via a pattern circuit.

These sound element medium 3 and pen-type reader converter 4 make up a musical instrument system (see FIG. 1).

Figure 4:
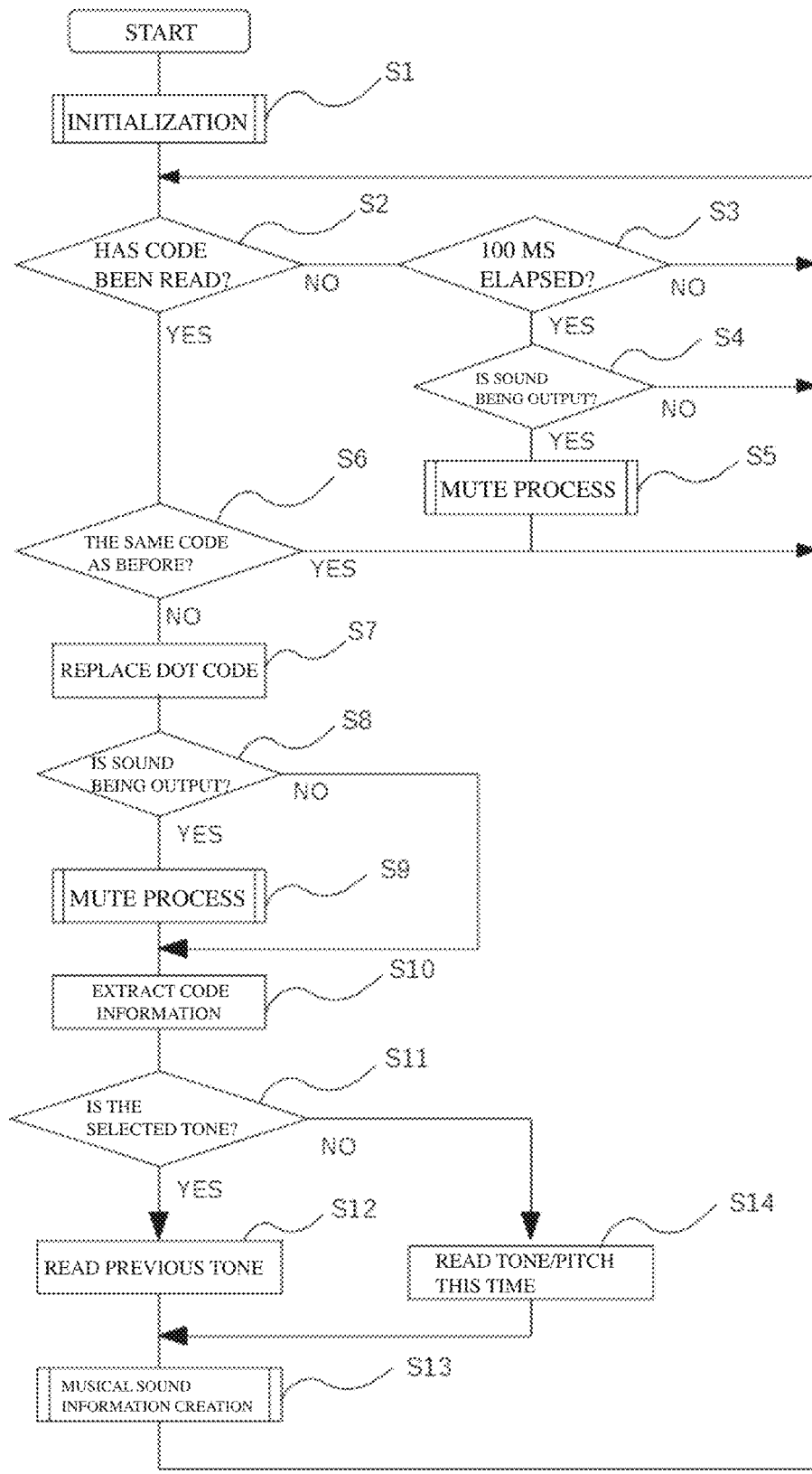
FIG. 4 is a flowchart illustrating an example of a musical sound creation program.

Next, the musical sound creation program illustrated in FIG. 4 will be described.

In response to turning on the power switch (not shown) of the reader converter 4, the controller 9 reads a musical sound creation program from the program storage unit 10 to execute initialization process (step s1). The initialization process initializes the reader converter 4 so as to store tone information indicating a tone of the default (piano) in the selected tone storage unit 8, activate the reader 6, and set a predetermined reading speed. Then, the procedure waits for the reading of a dot code by the reader 6.

The controller 9 determines whether or not sound element information has been acquired from the reader 6 (step s2). If no sound element information has been acquired (step s2: NO), the controller 9 measures the time during which the sound element information has not been acquired, and determines whether or not a predetermined time (e.g., 100 ms) has elapsed (step s3). If the predetermined time has not elapsed (step s3: NO), the procedure jumps to step s2. If a predetermined time has elapsed (step s3: YES), the controller 9 determines whether or not a musical sound is being output (step s4). If a musical sound is being output (step 4: YES), the controller 9 mutes the sound (step s5) and the procedure jumps to step s2. If no musical sound is being output (step 4: NO), the procedure jumps to step s2. In the processes in steps s2 to s5, the timing for muting (100 ms) is provided. This is for eliminating a user's feeling of strangeness caused by the continuous sound output when the system successively performs the reading process except for the operation immediately after turning-on of the switch, and the opening 61 of the reader 6 is located away from the paper surface of the cards 1 and 2, i.e., the dot patterns are not being read.

In step s2, if the sound element information is acquired (step s2: YES), the controller 9 determines whether the acquired sound element information is the same as the previously acquired sound element information (whether they are the same or different) (step s6). If they are the same (step s6: YES), the procedure jumps to step s2. This means that the procedure does not shift to the following step of generating musical sound information, and avoids the process of generating musical sound information to produce a musical sound based on the musical sound information (processing avoidance). In this way, if the acquired sound element information is the same as the previous one, this means that the user continues to keep the opening 61 at the tip of the reader 6 in contact with the sound element medium 3 (card 1 or 2). Such a case causes the reading of the same sound element information. The controller 9 therefore determines whether the acquired sound element information is the same or not, and controls for processing avoidance not to produce the same sound continuously. This process prevents the generation of the same sound as a continuously hitting sound.

In step s6, if the sound element information is different from the previous sound element information (step s6: NO), the controller 9 controls to replace the previous sound element information with the current sound element information (step s7). At this step, if a musical sound is being output (step s8: YES), the controller 9 mutes the sound like the mute process at step s5 (step s9). Subsequently, the controller 9 extracts pitch identification information, tone identification information, and tone change information, etc. from the current sound element information (step s10). In step s8, if no musical sound is being output (step 8: NO), the procedure jumps to step s10.

Following the process of step s10, the procedure executes step s11. In step s11, the controller 9 checks the tone change information extracted in step s10 (tone change determination). If the tone change information contains that the tone is not to be changed, the controller 9 determines that the user is reading a pitch card 1, and reads the tone information already stored in the selected tone storage unit 8 and the pitch information corresponding to the pitch identification information acquired this time from the pitch/tone storage unit 7 (step s12). Then, the controller 9 executes musical sound information creation process that generates musical sound information based on the read tone information and pitch information (musical sound information creation) (step s13).

In step s11, if the tone change information contains that the tone is to be changed, the controller 9 determines that the user is reading a tone card 2. Then the controller 9 extracts the tone information corresponding to the tone identification information contained in the sound element information read this time and the pitch information corresponding to such pitch identification information from the pitch/tone storage unit 7, and registers the extracted tone information with the selected tone storage unit 8 (step s14) and generates musical sound information based on the extracted tone information and pitch information (musical sound information creation) (step s13). Then the procedure jumps to step s2.

Figure 5:
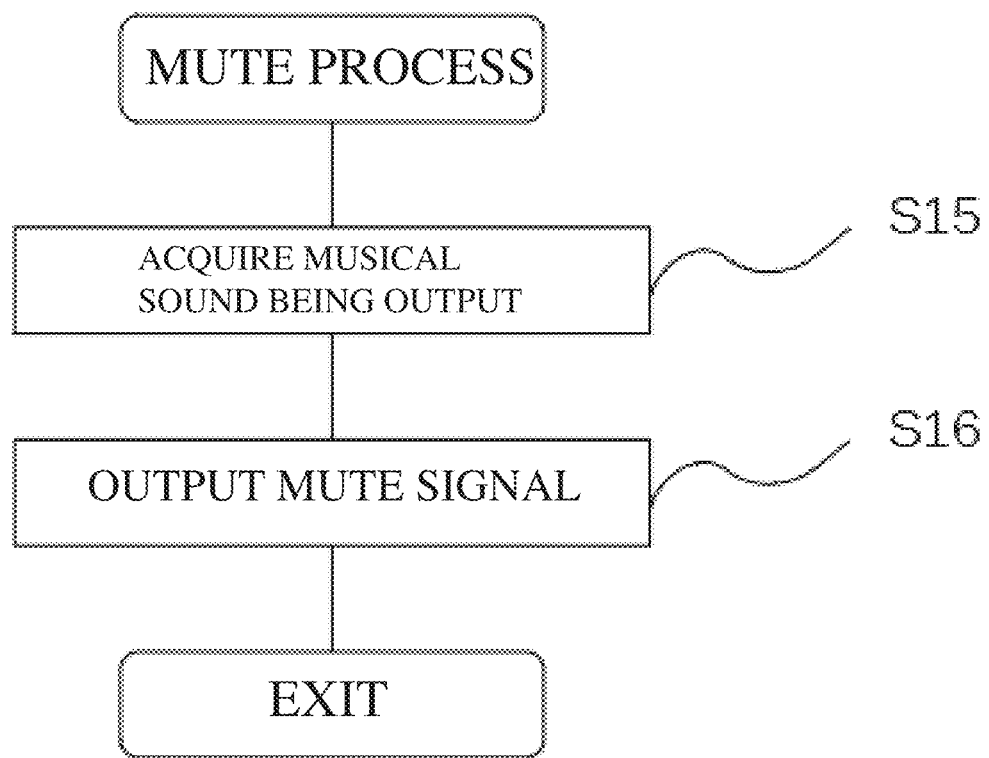
FIG. 5 is a flowchart illustrating an example of the mute process.

Next, referring to FIG. 5, the mute process of steps s5 and s9 will be described.

The mute process stops the musical sound that is being produced at the time of the mute process. In the present embodiment, after acquiring the musical sound information that is being produced (step 15), a signal for gradually lowering the volume of the sound being produced is output to the audio unit 12, and then a signal (mute signal) for stopping the output of the sound is output to the audio unit 12 (step s16). For the signal that gradually lowers the volume of the sound, a value that gradually reduces the output level of the sound is output in a predetermined cycle to a control register for sound outputting that the controller 9 (CPU) has.

Figure 6:
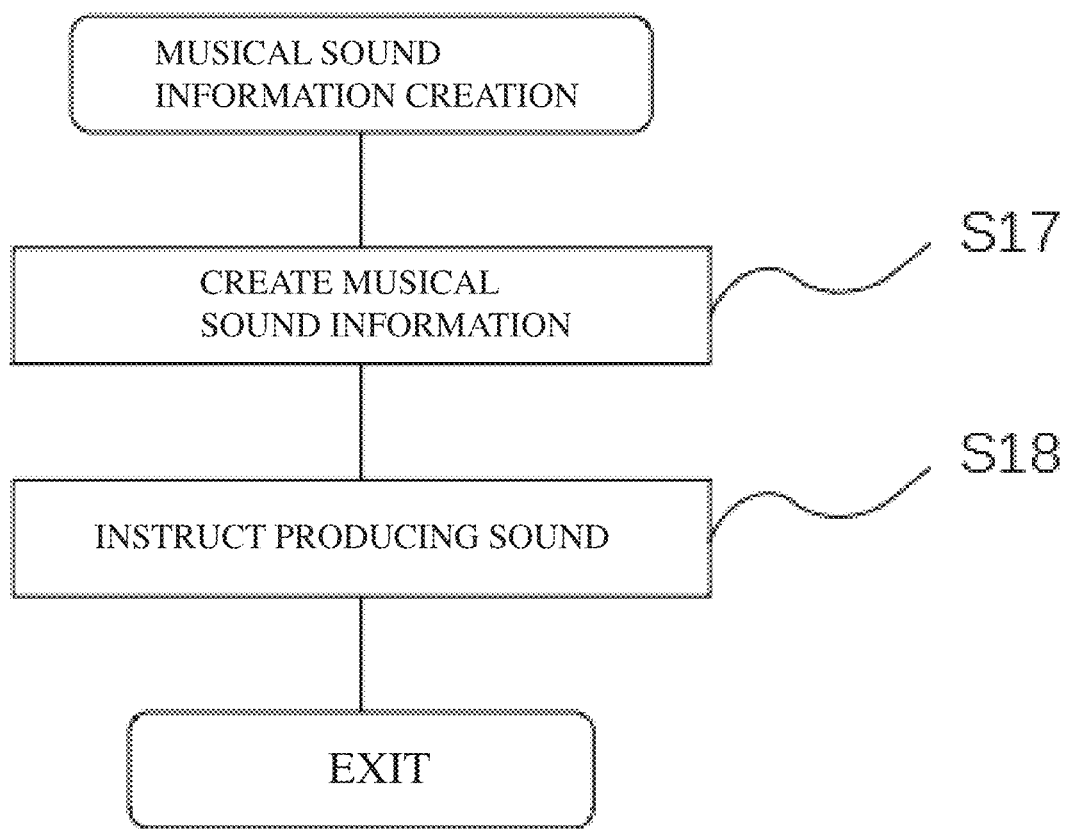
FIG. 6 is a flowchart illustrating an example of the musical sound information creation process.

Next, referring to FIG. 6, the musical sound information creation process of step s13 will be described.

In this musical sound information creation process, the controller 9 generates musical sound information for producing a musical sound based on the result of the process in step s11 or step s14, and according to the extracted tone information and pitch information (step s17). Then the controller 9 outputs the generated musical sound information to the audio unit 12 (step s18).

Receiving the musical sound information, the audio unit 12 acquires sound source information corresponding to the musical sound information from the sound source storage unit 11 to make the speaker 5 produce a sound. The reader converter 4 stores types of sound source in the sound source storage unit 11 in advance. When the sound source storage unit 11 stores a MIDI sound source, the controller 9 generates a musical sound information corresponding to the MIDI sound source for outputting. When the sound source storage unit 11 stores a WAV sound source, the controller 9 generates a musical sound information corresponding to the WAV sound source for outputting.

Instead of the sound-producing process of steps s12 and s13 or the sound-producing process of steps s14 and s13, the controller 9 can acquire an index of pitch data from the selected tone, search for reproduced audio data while setting the acquired pitch as the index, and give the acquired musical sound information to a sound system.

In the present embodiment, the reader converter 4 includes the reader 6, the pitch/tone storage unit 7, the selected tone storage unit 8, and the controller 9 that executes a function of extracting pitch information and tone information from the pitch/tone storage unit 7 based on the sound element information from the reader 6 and outputting musical sound information based on various sound sources stored in the sound source storage unit 8.

The sound-element attached surface may represent with drawing of pitches and tones with musical notes, colored characters, and the like. The optically readable information is not limited to dots, which may be colors or figures. In this case, the information may be recognized by irradiating with ultraviolet rays. In another example, the information may be recognized with unevenness, and in this case, it can be recognized with ultrasonic waves. The reader 6 can include a transmitter/receiver to wirelessly transmit the dot codes to the controller 9.

The sound element information on the sound element can be a dot pattern on the surface of the sound element medium 3, or can be a dot code assigned to the dot pattern. The tone change information can be specified by bit information at a predetermined position in a bit string, or can be specified by the absence of information at a predetermined position.

This embodiment allows a user who is not able to play a music instrument to easily play a song, and also provides an environment in which infants and lower grade levels can compose a song while playing. This embodiment provides the environment where users can play music by arranging sound-element information areas of the pitch identification information in rows corresponding to various keys, from which the users can acquire the ability of relative hearing.

Embodiment 2

In this embodiment, like reference numerals designate identical or corresponding components in FIG. 1 to FIG. 6. The present embodiment includes a sound-element information area, which is a card-like sound element medium 3 in Embodiment 1 (sound-element information area), integrally placed at one section of the plane of a paper surface 13. This sound-element information area 3 can be placed by: printing it on a single sheet; by placing a printed one on a single page of a score book; or by attaching a sticker type sound element information area 3 to a plain paper sheet.

Figure 7:
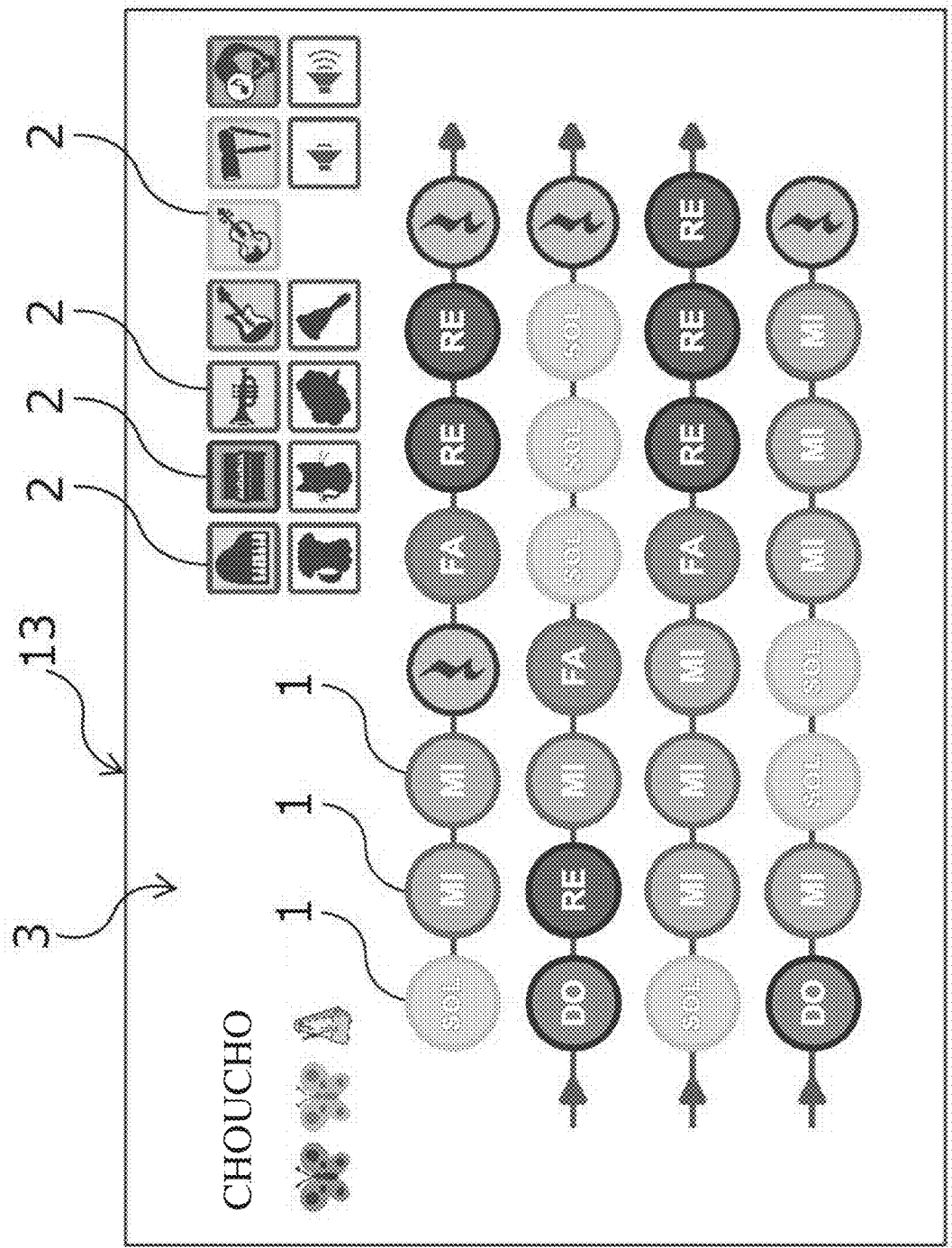
FIG. 7 describes one example of a sound element medium for a musical instrument system according to a second embodiment (Embodiment 2) of the present invention.

In FIG. 7, the sound element medium 3 contains sound element information for playing a musical piece "Choucho" (meaning Butterfly in Japanese), and includes a plurality of pitch information areas 1 and a plurality of tone information areas 2. Each of the pitch information areas 1 is a circular area. The pitch is printed in the area, and the color corresponding to the pitch is given as the background color of the area. On this pitch information area 1, a dot pattern for pitch corresponding to the indicated pitch is printed in a superimposed manner. A plurality of pitch information areas 1 is configured by placing these pitch information areas 1 in rows and in the order of pitches playing the "Choucho". Each of the tone information areas 2 is a square area. The design indicating the tone, such as the image of "piano", "organ", "trumpet", or "guitar", is printed in the area, and the tone dot pattern corresponding to the tone is printed in a superimposed manner.

The pitch information areas 1 are placed in rows, and makes the environment where sounds of the pitches in each row of the pitch information areas 1 are produced in the order of the rows based on the tone of the tone information area 2. These pitch information areas are placed so as to start to read the first row of the pitch information areas 1 beginning with the one printed as "sol" until the end of the first row, followed by reading "do" at the beginning of the second row. Like this, the pitch information areas are placed to read them in the orders of the rows.

The tone information areas 2 are located at the upper right position of the paper surface 13. They are placed in the upper row including, from the left, the sections of the tone information area 2 having the design representing the tone of piano, the tone information area 2 having the design of organ, the tone information area 2 having the design of trumpet, the tone information area 2 having the design of electric guitar, the tone information area 2 having the design of classical guitar, the tone information area 2 having the design of woodblock, and the tone information area 2 having the design of singer, and the lower row including, from the left, the sections of the tone information area 2 having the design of dog barking sound, the tone information area 2 having the design of cat mewing sound, and others.

Figure 8A:
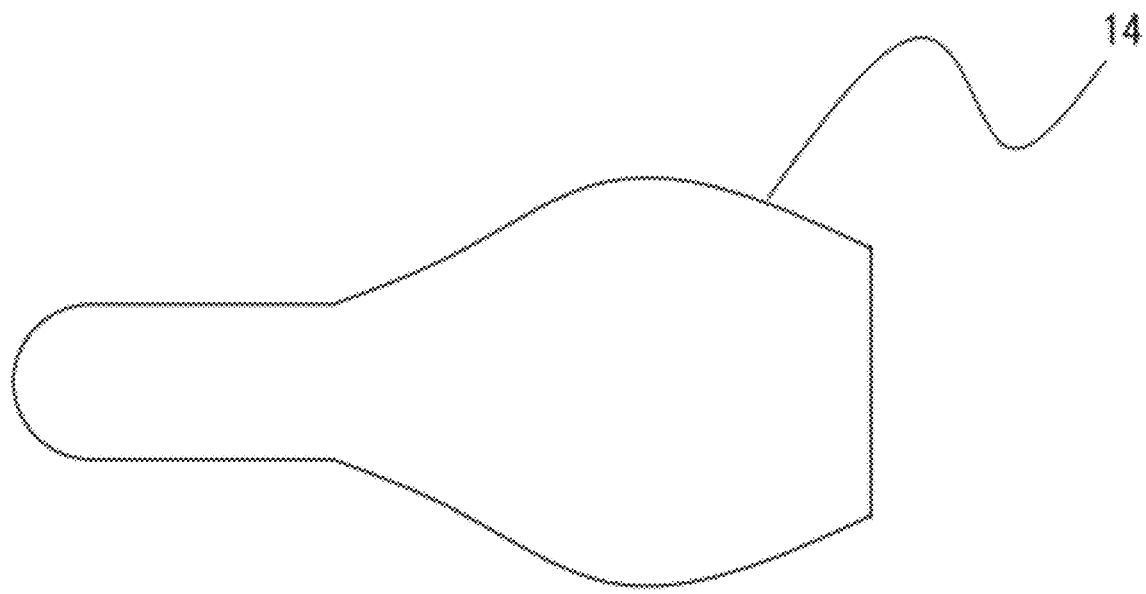
FIGS. 8A and 8B illustrate an example of a housing that accommodates the reader converter of the musical instrument system, where
Figure 8B:
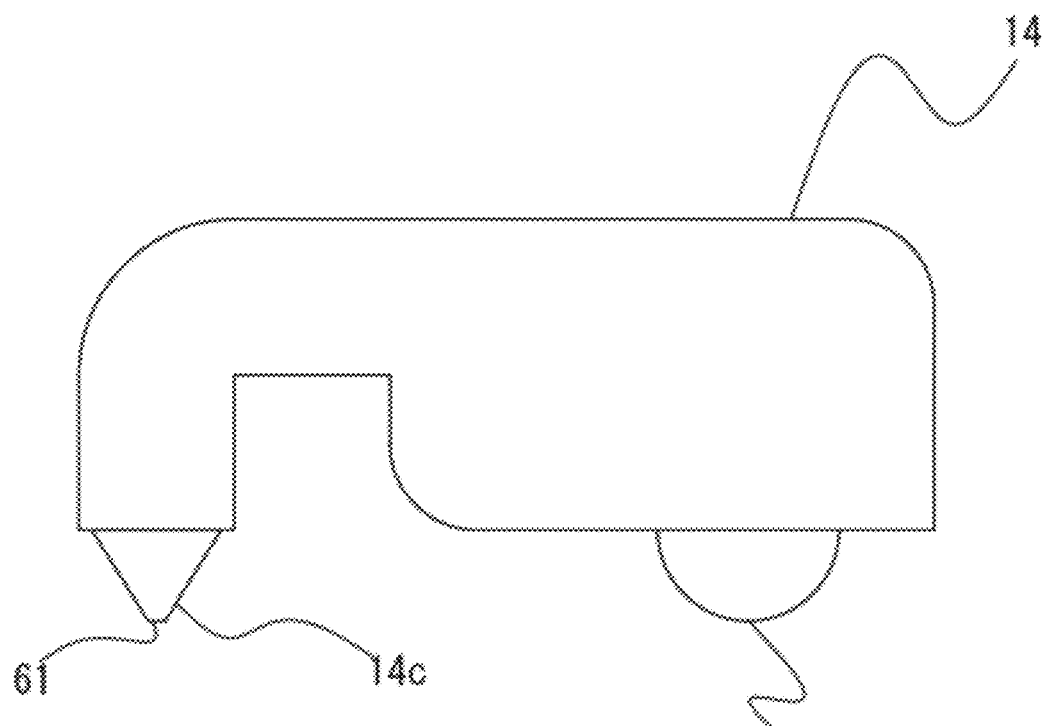

In FIGS. 8A and 8B, reference numeral 14 denotes a housing for accommodating the components of the reader converter 4. The housing 14 includes a body, an L-shaped portion, and a tip portion. The body houses a controller 9, a selected tone storage unit 8, a pitch/tone storage unit 7, and a program storage unit 10, and has feet 14a and 14b located below. The L-shaped portion extends from the front part of the body. The L-shaped portion bends downward, and has the tip portion 14c located below. The tip portion 14c has a triangular pyramid shape, and has the apex at the bottom. An opening 61 is formed at the end of the apex. These tip portion 14c and L-shaped portion house the reader 6, and the reader optically reads a dot pattern printed on the sound element medium 3 through the opening 61 of the tip portion 14c.

Figure 9:
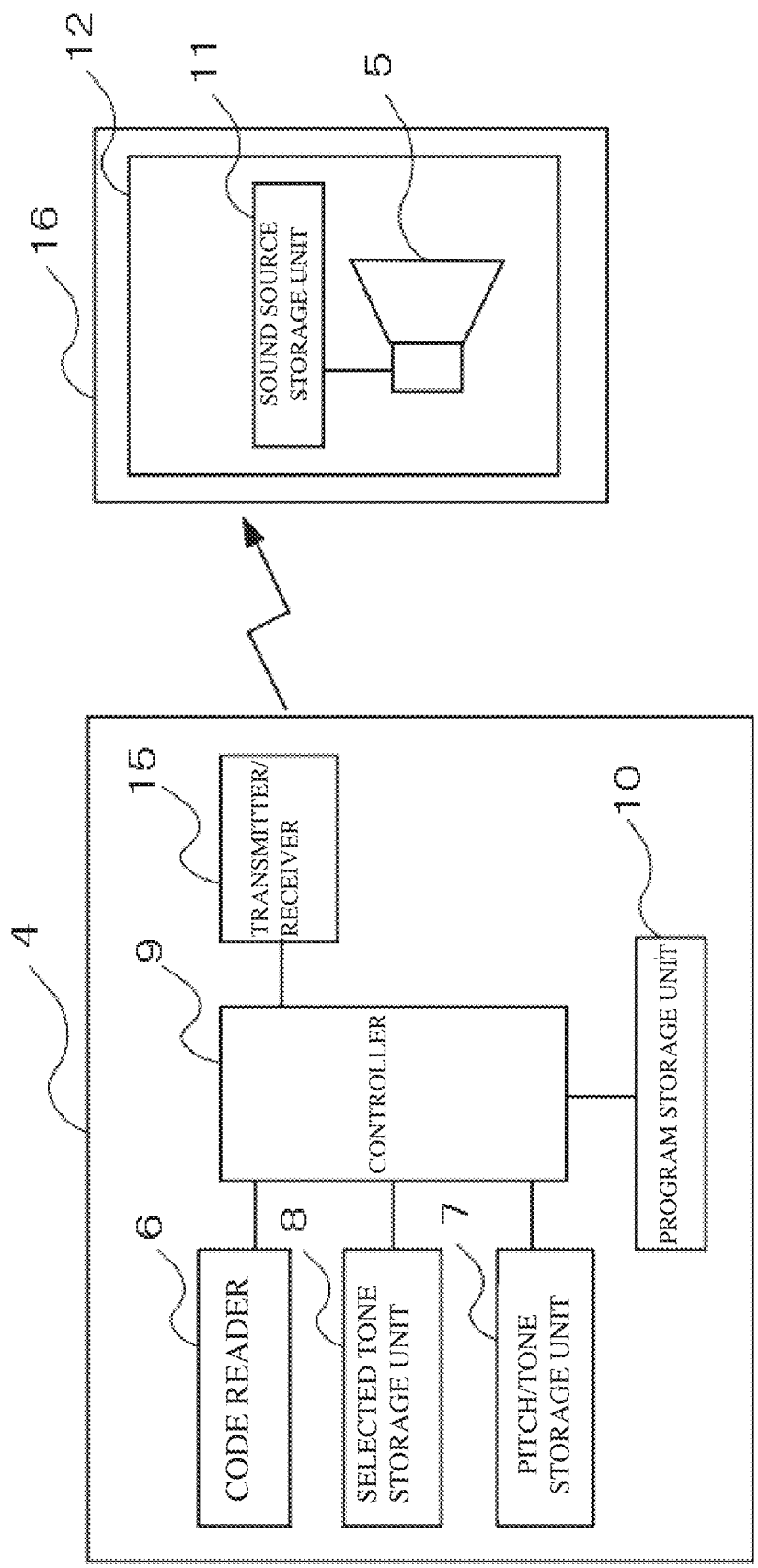
FIG. 9 is a block diagram illustrating a reader converter that wirelessly outputs musical sound information.

As illustrated in FIG. 9, this embodiment includes the reader converter 4 and an external device 16. The reader converter 4 includes a transmitter/receiver 15, in addition to the reader 6, the pitch/tone storage unit 7, the selected tone storage unit 8, the controller 9, and the program storage unit 10 as in Embodiment 1 as stated above. The transmitter/receiver 15 wirelessly outputs the musical sound information generated by the reader converter 4 to the external device 16 such as a smart device equipped with an audio unit (sound source mechanism) 12. The external device 16 may be a mobile terminal such as a smartphone or a tablet or a personal computer as long as it has the audio unit 12. It may be a dedicated audio device having a transmission/reception function.

In the present embodiment, a user selects a favorite tone from the tone information areas 2 printed on the paper surface 13, and then reads the tone dot pattern with the reader converter 4 to register the tone with the selected tone storage unit 8. Subsequently, the user operates the reader converter 4 over the pitch information areas, starting from the row beginning with the one printed as "sol" one by one in the direction of the arrow, so that the reader converter 4 reads the pitch dot patterns in these pitch information areas 1. This operation generates the musical sound information based on the read tone dot patterns and pitch dot patterns, and then the audio unit 12 of the external device 16 produces the sounds based on the musical sound information via the transmitter/receiver 15 illustrated in FIG. 9. This enables a user, even if they are not able to play the instrument, to select the favorite instrument as they like and play the song.

Modified examples of Embodiments 1 and 2 as described above will be described with reference to the drawing.

Modified Example 1

This example makes the environment where the pitch information areas (one of the sound-element information areas) and the tone information areas (the other sound-element information areas) are arranged separately. In this example, a plurality of rows of the pitch information areas are placed according to the score of the song, so that the song can be played by producing the sounds with pitches one by one in the order of rows of the placed pitch information areas and based on the one of the tones of the tone information areas.

Figure 10:
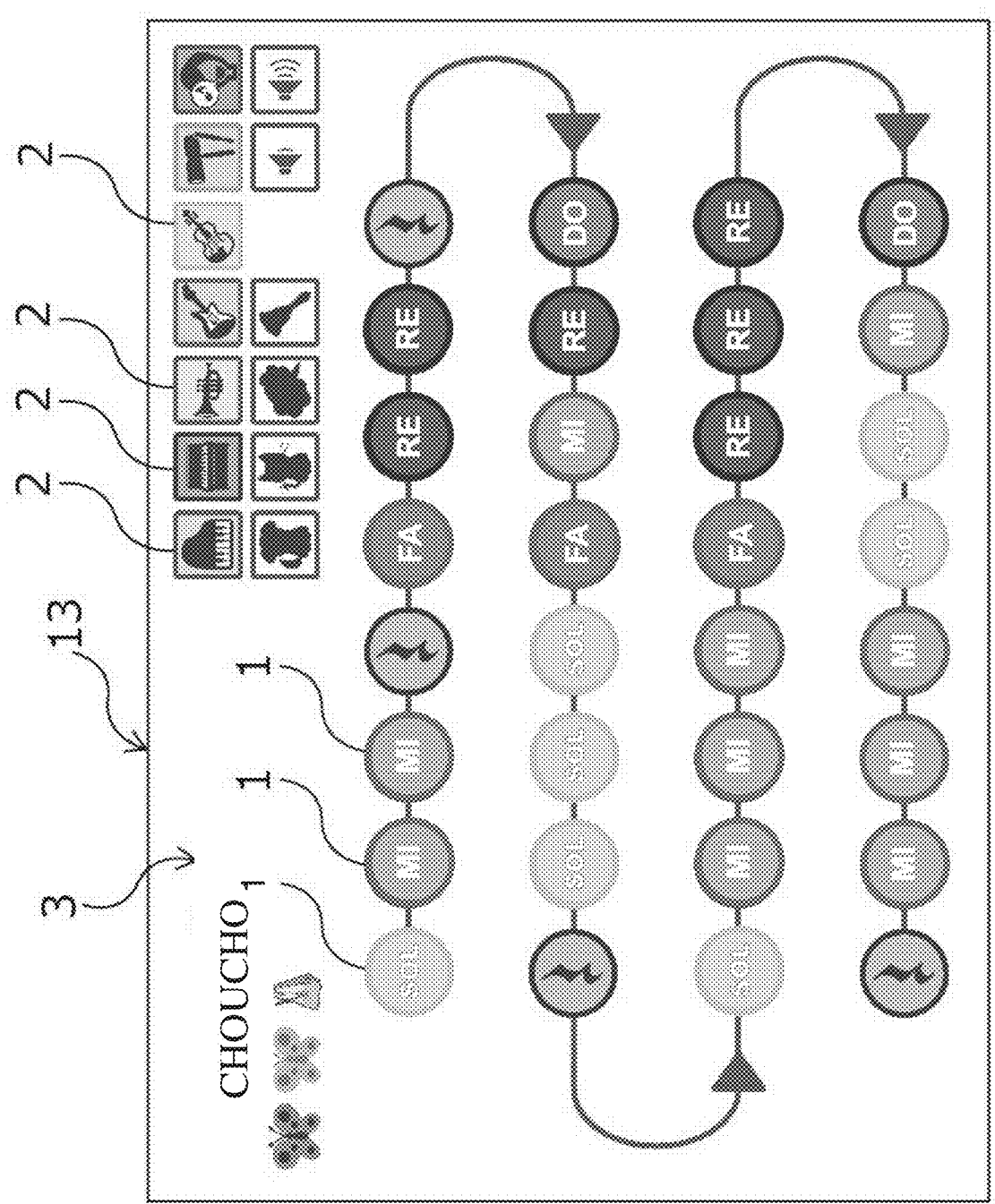
FIG. 10 explains a sound element medium.

On the paper surface 13 illustrated in FIG. 10, sections of the tone information areas 2 are placed at the upper right position. Separately from this group of the tone information areas 2, the example includes a plurality of rows of pitch information areas 1 that go back and forth according to the score of the song "Choucho". The upper row starts from a circular pitch information area 1 at the left end that indicates a katakana (type of Japanese characters) for "sol" representing the pitch and is painted with a specific color for the pitch "sol", followed by the pitch information area 1 for the pitch "mi".

Figure 11:
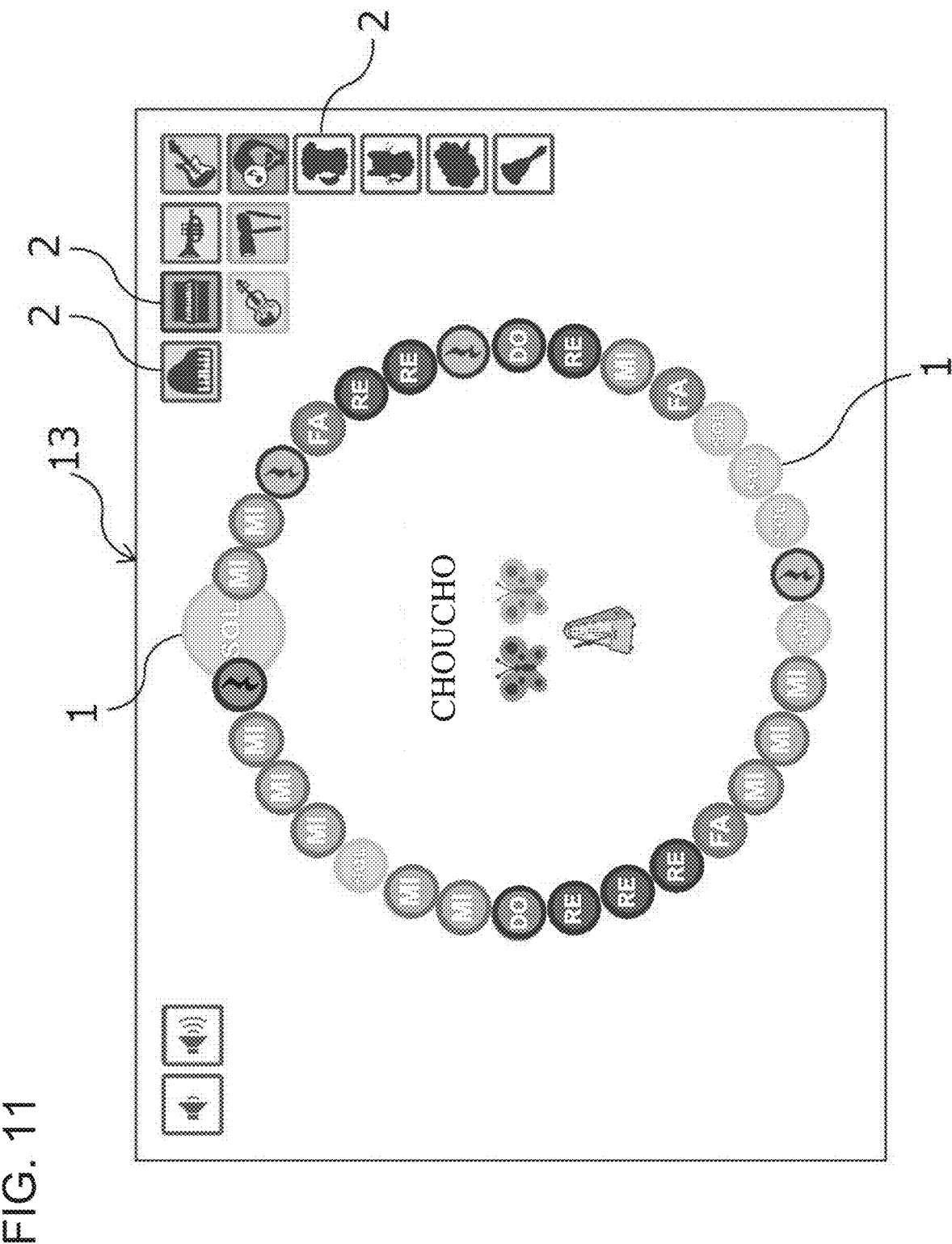
FIG. 11 explains a sound element medium.

On the paper surface 13 illustrated in FIG. 11, a plurality of pitch information areas 1 is placed in a line so as to form a circle. The pitch information area 1 located at the position where the reading should start has a larger size than other pitch information areas to notice the starting position to the user.

Modified Example 2

Pitch information areas 1 that the sound element medium 3 may have chord identification information that identifies chords composed of a plurality of pitches, and the chords may be indicated with visible characters on the surface. The following describes this example with reference to the drawing.

Figure 12:
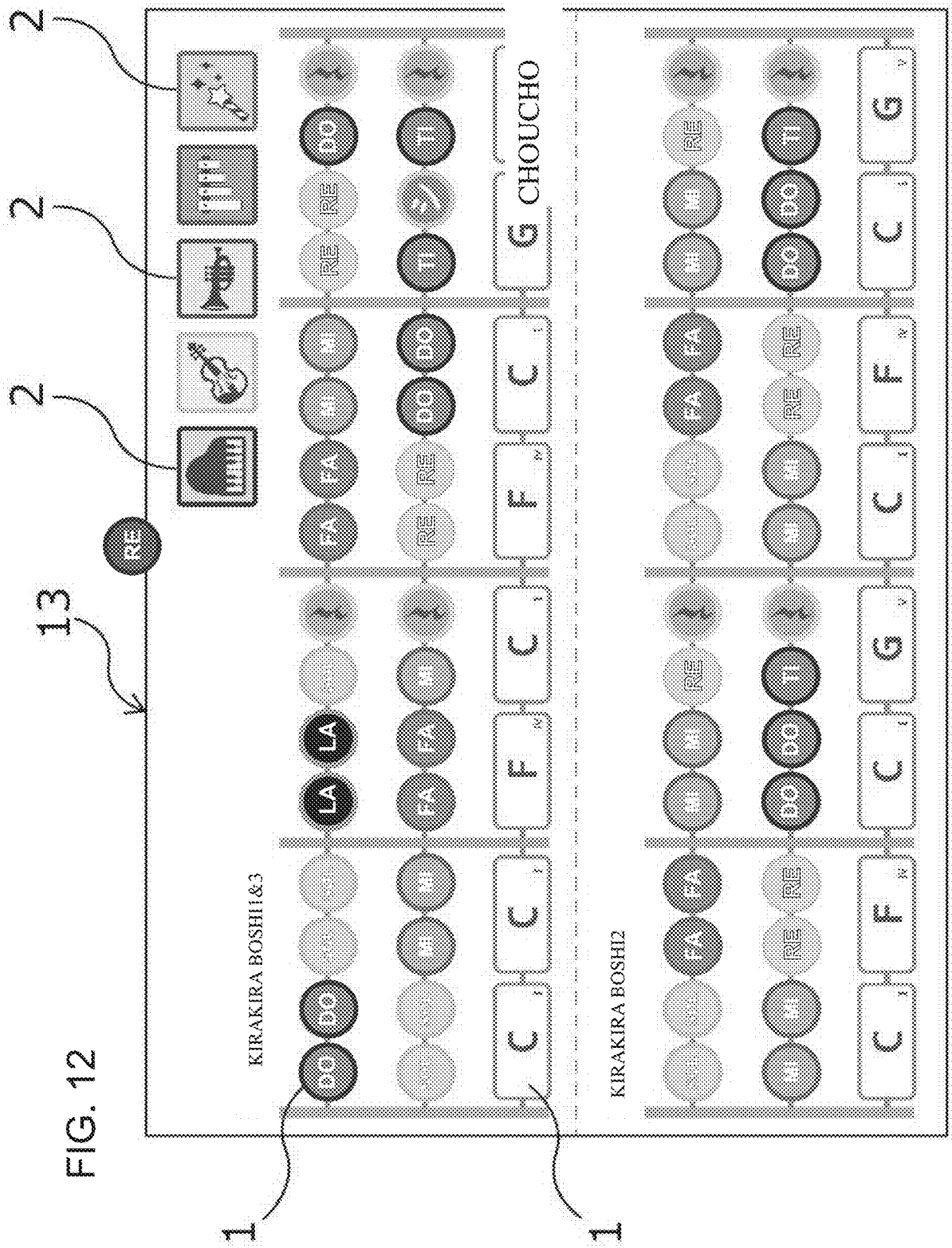
FIG. 12 explains a sound element medium.

On the paper surface 13 illustrated in FIG. 12, a plurality of rows of pitch information areas 1 (first row and second row) are placed according to the score of the song titled "Kirakira Boshi" or Twinkle Little Star, and the third row of the pitch information areas 1 shows a plurality of chords ("C", "C", "F", "C", "F", "C", "G", "C") that are placed in the order of the score.

Specifically, in this example, a plurality of rows of the pitch information areas 1 corresponding to the score of "Kirakira Boshi parts 1 & 3" and a plurality of rows of the pitch information areas 1 corresponding to the score of "Kirakira Boshi part 2" are printed on the paper surface 13. The plurality of pitch information areas 1 corresponding to the score of "Kirakira Boshi parts 1&3" includes three rows of the plurality of pitch information areas 1. The plurality of pitch information areas 1 corresponding to the score of "Kirakira Boshi part 2" also includes three rows of the plurality of pitch information areas 1. Then, this examples lets the user use three of the reader converters 4 to read the bars in the first row, the second row, and the third row of "Kirakira Boshi 1&3" at the same time for producing the sounds, followed by producing of sounds in the three rows of "Kirakira Boshi 2" in the same manner, followed again by the producing of sounds in the three rows of "Kirakira Boshi 1&3" in the same manner. In the pitch information areas 1 in the third row in the scores, the chord identification information corresponding to the indicated chord is encoded in a dot pattern, and is printed in a superimposed manner.

Modified Example 3

The following describes a sound element medium 3 in which the tone information includes the tone information areas 2 indicating the transposition of the tones, with reference to the drawing.

Figure 13:
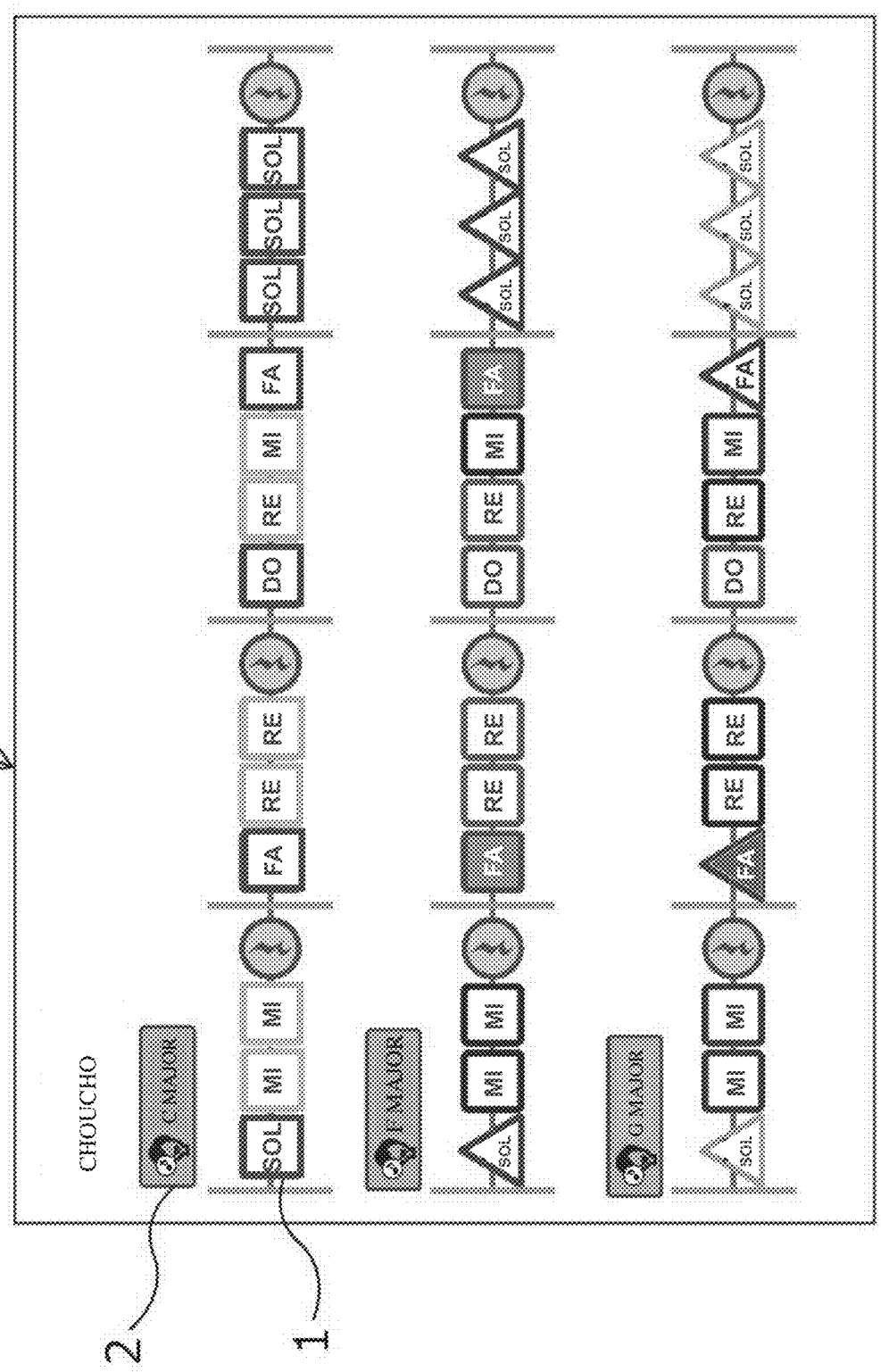
FIG. 13 explains a sound element medium.

On the paper surface 13 illustrated in FIG. 13, the sound element medium 3 includes printed areas of: a tone information area 2 including, as the tone, an image of a human face who is singing, on which the letter of C major is printed together, and pitch information areas 1 in a row that is separated from the tone information area 2 and indicates the pitches; a tone information area 2, on which the letter of F major is printed, and pitch information areas 1 in a row that is separated from the tone information area 2 and indicates the pitches; and a tone information area 2, on which the letter of G major is printed, and pitch information areas 1 in a row that is separated from the tone information area 2 and indicates the pitches. In the tone information areas 2, key identification information corresponding to the indicated key is encoded in a dot pattern, and is printed in a superimposed manner.

Figure 14:
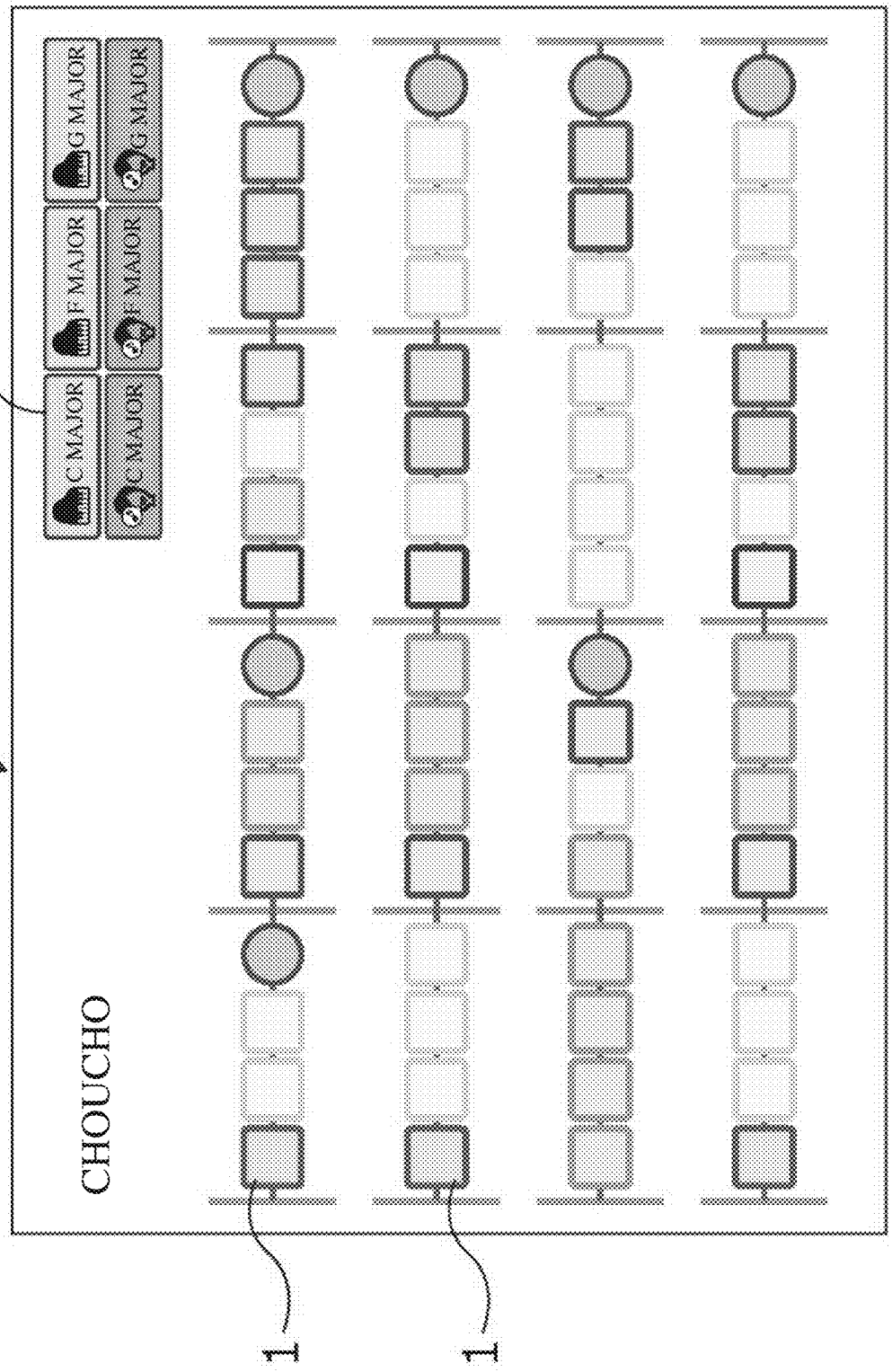
FIG. 14 explains a sound element medium.

On the sheet surface 13 illustrated in FIG. 14, a plurality of pitch information areas 1 is placed. In this example, the pitch information areas 1 do not include letters indicating the pitches making up the score of the song, but having square shapes with colors.

A sound-element information area that gives other sound elements may be placed outside the pitch information areas 1 and the tone information areas 2. The pitch information areas 1 may include only pitch identification information, and the tone information areas 2 may include both the pitch identification information and the tone identification information.

A sound source input medium (sound element medium) may include a plurality of scale information areas (pitch information areas) to which information identifying a pitch name or pitch is assigned, and at least one tone information area (tone information area) to which information representing a tone is assigned. The at least one tone information area is placed separately from the scale information areas. A plurality of rows of the scale information areas may be placed for use, and the environment may be made such that sounds of the pitch names or pitches in the rows of pitch information areas are produced in the order of rows based on the tones in the tone information areas. A sound source input medium (sound element medium) may include a plurality of pitch information areas (pitch information areas) to which information identifying a pitch is assigned, and at least one tone information area (tone information area) to which information representing a tone is assigned. The at least one tone information area is placed separately from the pitch information areas. A plurality of rows of the pitch information areas may be placed for use, and the environment may be formed such that sounds of the pitches in the rows of pitch information areas are produced in the order of rows based on the tones in the tone information areas.

The tone information areas 2 can be given tone identification information for transposition of the tones. For "C major", the icon indicating that the key is in C major may be used, for "G major", the icon indicating that the key is in G major may be used, and for "F major", the icon indicating that the key is in F major may be used. For the tone information area 2 of "piano", the icon indicating the production of a piano instrument sound may be used, and for the pitch information area 1 of "pitch", the icon indicating the production of a speech sound corresponding to the indicated pitch may be used.

Embodiment 3

Figure 15:
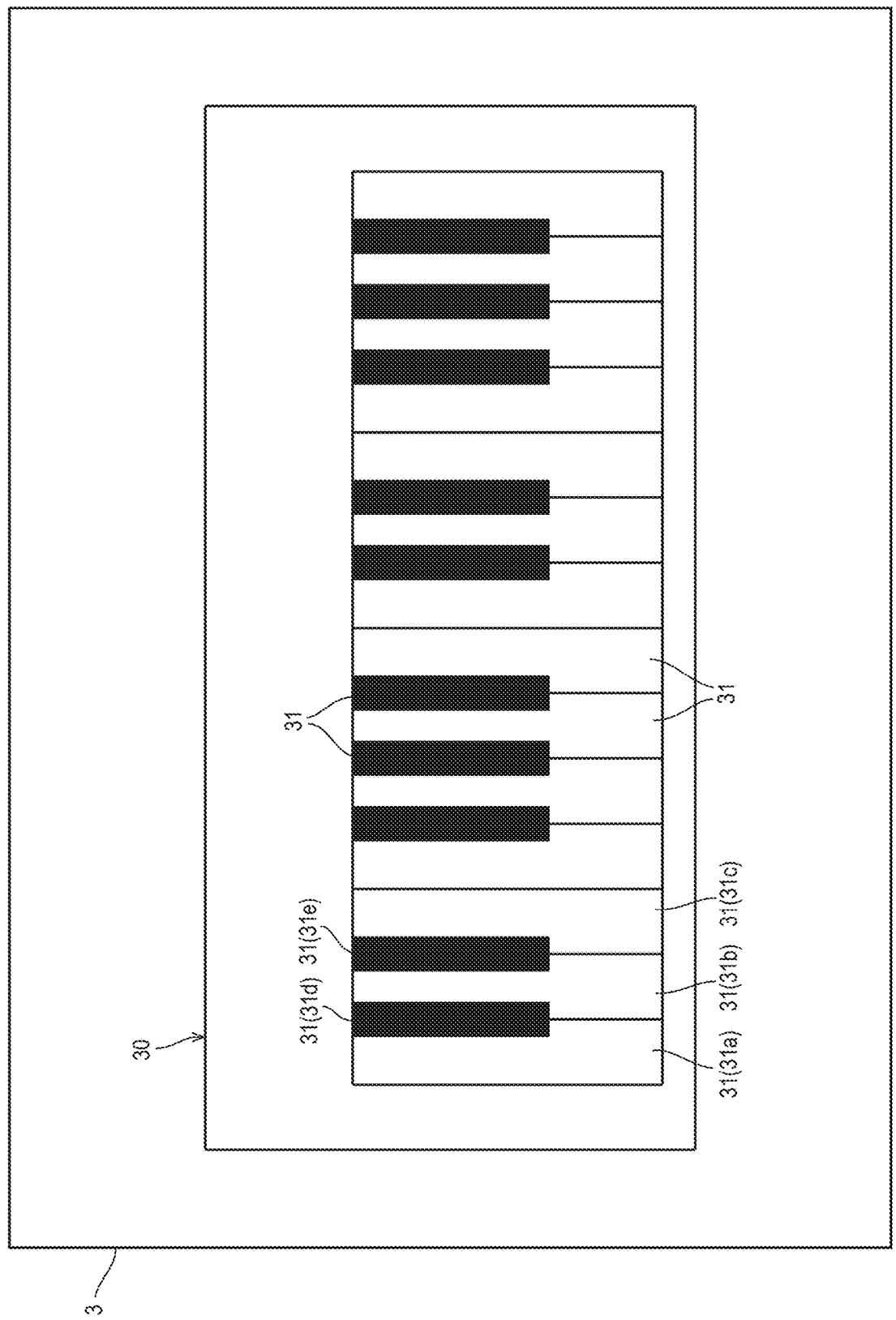
FIG. 15 is a plan view of a sound element medium according to a third embodiment (Embodiment 3).

As illustrated in FIG. 15, a sound element medium 3 of Embodiment 3 includes an illustration 30 of a piano keyboard printed on a paper surface. The keyboard has a plurality of keys 31 (31a, 31b, 31c, 31d, 31e . . . ). In the printing area of each key 31, sound element information is encoded in a dot pattern and is printed. The sound element information includes: tone identification information for identifying that the tone is a piano sound; pitch identification information that is uniquely given to each key 31 so as to identify the pitch of the key 31; and tone change information specifying that the tone should be changed. For example, in the area 31a displaying the key of "do", sound element information in a dot pattern is encoded and printed, and the sound element information includes the tone identification information identifying that the tone is a piano sound and the pitch identification information identifying "do".

When the user brings the tip of the reader converter 4 into contact with any of the keys 31 of the keyboard printed on the sound element medium 3, the reader 6 of the reader converter 4 reads the sound element information from the dot pattern printed on the key 31 via the opening. The controller 9 of the reader converter 4 extracts the tone identification information, the pitch identification information, and the tone change information from the sound element information acquired from the reader 6 (S10). The controller 9 then extracts tone information and pitch information corresponding to the tone identification information and the pitch identification information obtained this time, respectively, from the pitch/tone storage unit 7 (S14). Then, the controller 9 generates musical sound information based on the extracted pitch information and tone information (S13). A sound of the generated musical sound information is produced through the audio unit 12.

Next, the following describes a training method for acquiring relative hearing in the present invention. In the above-described embodiments and modified examples, the pitch is used as a concept including solfas and pitch names. In the following description, the relative hearing will be explained while distinguishing solfas and pitch names.

Table 1 shows the relationship between keys and pitches. There are 12 types of keys defined in music as in the following table.

TABLE 1

| Keys | Pitch names of keynotes | Pitch names corresponding to solfas |
| --- | --- | --- |
| C major | C | Do Re Mi Fa Sol La Ti |
| D major | D | D E F# G A B C# |
| E major | E | E F# G# A B C# D# |
| F major | F | F G A A# C D E |
| G major | G | G A B C D E F# |
| A major | A | A B C# D E F# G# |
| B major | B | B C# D# E F# G# A# |
| C sharp major | C# | C# D# F F# G# A# C |
| D sharp major | D# | D# F G G# A# C D |
| F sharp major | F# | F# G# A# B C# D# F |
| G sharp major | G# | G# A# C C# D# F G |
| A sharp major | A# | A# C D D# F G A |

In the table, the letters A to G are used to represent pitch names. Solfas are written as Do-Re-Mi-Fa-Sol-La-Ti, and the pitch names are written as CDEFGAB. As shown in this table, the pitch name corresponding to the solfa "Do" depends on the key.

Only in C major, the pitch names and solfas match as follows.

Do Re Mi Fa Sol La Ti
C D E F G A B

The pitch names and solfas do not match in keys other than C major.

For example, in G major,
Do Re Mi Fa Sol La Ti
G A B C D E F #

In F major,
Do Re Mi Fa Sol La Ti
F G A A #C D E

After turning on the power of the reader converter 4, assume that the instrument sound is a piano sound, and the key is in C major. The sound elements are connected to form a line. The user may play a song by touching the sound elements one by one in the order from left to right according to a time sequence.

1. Playing in Instrumental Sound in C Major

Touch "Piano in C Major" (See FIG. 14) with the Reader Converter for playing. This means that the piano instrument sound corresponding to the pitch name sounds. No speech sound is produced. The mark "•" represents a rest. On the pitch card 1, pitch name identification information, which is for identifying the pitch name, is encoded in a dot pattern and is printed. Then, the reader converter identifies the pitch name based on the pitch name identification information read by the reader to produce a sound corresponding to the pitch name.

The pitch names of the children's song "Tulip" in C major

| | | | |
|---|---|---|---|
| CDE• | CDE• | GEDC | DED• |
| CDE• | CDE• | GEDC | DEC• |
| GGEG | AAG• | EEDD | C••• |

2. Playing in Instrumental Sound in G Major

Touch "Piano in G major" with the reader converter for playing. This means that the piano instrument sound corresponding to the pitch name sounds. No speech sound is produced.

The pitch names of the children's song "Tulip" in G major

| | | | |
|---|---|---|---|
| GAB• | GAB• | DBAG | ABA• |
| GAB• | GAB• | DBAG | ABG• |
| DDBD | EED• | BBAA | G••• |

3. Playing with Instrumental Sound in F Major

Touch "Plano in F major" with the reader converter for playing. This means that the piano instrument sound corresponding to the pitch name sounds. No speech sound is produced.

The pitch names of the children's song "Tulip" in F major

| | | | |
|---|---|---|---|
| FGA• | FGA• | CAGF | GAG• |
| FGA• | FGA• | CAGF | GAF• |
| CCAC | DDC• | AAGG | F••• |

4. Playing with Speech Sounds Representing Solfas

Touch any one of "Human voice in C major", "Human voice in F major", and "Human voice in G major" with the reader converter for playing. In this mode, speech sounds representing solfas (hereinafter called solfa sounds) are produced according to the key set for the current performance. No instrumental sounds are produced. On each pitch card 1, solfa identification information, which is for identifying the solfa, is encoded in a dot pattern and is printed. Then, the reader converter identifies the solfa based on the solfa identification information read by the reader to produce a sound corresponding to the solfa.

Solfas of the children's song "Tulip"

| | | | |
|---|---|---|---|
| Do-Re-Mi-• | Do-Re-Mi-• | So-Me-Re-Do | Re-Mi-Re-• |
| Do-Re-Mi-• | Do-Re-Mi-• | So-Me-Re-Do | Re-Mi-Do-• |
| So-So-Mi-So | Ra-Ra-So-• | Mi-Mi-Re-Re | Do-••• |

Using the system equipped with the above four types of playing methods, repeat the performance as follows.

Instrument sounds in C major→Solfa sounds in C major→Instrument sounds in C major→Solfa sounds in C major Once the user gets used to this, repeat the same for different keys as follows.

Instrument sounds in F major→Solfa sounds in F major→Instrument sounds in F major→Solfa sounds in F major Instrument sounds in G major→Solfa sounds in G major→Instrument sounds in G major→Solfa sounds in G major Once the user further gets used to it, change the key only for solfa sounds for performance.

Solfa sounds (C major)→Solfa sounds (G major)→Solfa sounds (F major)

Repeating this becomes a training to acquire the ability to "always recognize which sound is the keynote, even if the key changes".

The following describes the features of the musical instrument system (paper and reader converter) embodiments of of the present invention.

As mentioned above, the system for acquiring relative hearing has three features. Due to these features, the player (performer) can practice for acquiring relative hearing ability without the help of an instructor.

The first feature is that the player can listen to the solfa corresponding to their performance without having to master the technique of playing musical instruments. Typically, playing a musical instrument that outputs a pitch requires acquisition of the playing technique specific to that instrument. In general, this requires practicing involving patience, and many people give up playing before enjoying the music itself. This system requires almost no playing technique. Simply touching the surface of the paper with the reader converter like a percussion instrument produces desired sounds. The player therefore enjoys the performance itself rather than learning the playing technique.

The second feature is that the player can play a song that they already know and listen to the names of solfas in the song. They can listen to both performances by instrumental sounds and by solfa sounds as they like. This allows the player to learn the technique of "understanding each sound element in the song in terms of the pitch distance from the keynote".

The third feature is that the player is able to experience that terms of the solfas do not change with keys. The mode of "listening to the instrument sounds and the solfa sounds alternately with one key" is insufficient for a system. This is because that other persons cannot tell whether the player listens to a solfa sound in terms of the "pitch distance from the keynote" or they listen to the solfa sound as the "pitch itself". In order for the performer to understand that the solfa sound represents the "pitch distance from the keynote", they have to listen to the same song with different keys, and then have to understand that the solfa sound does not change with keys. The musical instrument system of the present invention can easily achieve this.

The present invention provides a musical instrument system at a low cost including a card or a paper surface, on which rows of areas as sections each having pitch identification information indicating the pitch are continuously placed. The musical instrument system allows a user to easily play a song using a favorable tone by producing the sounds in the order of rows, and thus allows even a learner who is not good at playing musical instruments to play melody and develop a sense of the pitch.

A user, who is not able to play a musical instrument, also is allowed to play a song, compose a song freely, and develop a sense of relative hearing, and thus the system can be used as a new music learning material.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A musical instrument system comprising: a sound element medium including a printing surface having a plurality of sound-element information areas each having sound element information on a sound element;

a reader configured to optically read the sound element information;

a generator configured to generate musical sound information based on the read sound element information; and an audio unit configured to produce a sound based on the generated musical sound information, each of the sound-element information areas having a display corresponding to the sound element information, the sound element information relating to both or one of pitch and tone and being printed in the sound-element information areas in a manner to be optically readable by the reader, the plurality of sound-element information areas include at least one pitch information area having information on the pitch, and a tone information area having information on the tone, the at least one pitch information area includes a plurality of pitch information areas, the plurality of pitch information areas is disposed in rows in the order of the pitches of a musical piece played by the performers, and the reader reads the plurality of pitch information areas in an order of the rows.

2. The musical instrument system according to claim 1, wherein the reader reads information on the tone of the tone information area and information on the pitch of the at least one pitch information area, and the generator generates musical sound information to produce a sound with the pitch and the tone.

3. The musical instrument system according to claim 2, wherein the at least one pitch information area and the tone information area are separated from each other.

4. The musical instrument system according to claim 2, further comprising a storage unit that stores the read information on tone, wherein the generator generates musical sound information based on the stored information on tone.

5. The musical instrument system according to claim 1, wherein the plurality sound-element information areas includes a surface of a flat card.

6. The musical instrument system according to claim 1, wherein the plurality of sound-element information areas is located on a single plane.

7. The musical instrument system according to claim 1, wherein the sound element information relating to the sound element is printed on the display in a superimposed manner.

8. The musical instrument system according to claim 1, wherein the generator generates the musical sound information when the read sound element information is different from the sound element information read immediately before.

9. A sound element medium comprising a printing surface having a plurality of sound-element information areas each having sound element information on a sound element, each of the sound-element information areas having a display corresponding to the sound element information, the sound element information relating to both or one of pitch and tone and being printed in the sound-element information areas in a manner to be optically readable, the plurality of sound-element information areas include at least one pitch information area having information on the pitch, and a tone information area having information on the tone, the at least one pitch information area includes a plurality of pitch information areas, and the plurality of pitch information areas is disposed in rows in the order of the pitches of a musical piece played by the performers.

10. A reader converter comprising:

a reader configured to read sound element information from a sound element medium, the sound element medium including a printing surface having a plurality of sound element information areas each having sound element information on a sound element, each of the sound-element information areas having a display corresponding to the sound element information, the sound element information relating to both or one of pitch and tone and being printed in the sound-element information areas in a manner to be optically readable, the plurality of sound-element information areas include at least one pitch information area having information on the pitch, and a tone information area having information on the tone, the at least one pitch information area includes a plurality of pitch information areas, the plurality of pitch information areas is disposed in rows in the order of the pitches of a musical piece played by the performers; and a generator configured to generate musical sound information based on the read sound element information.

* * * * *